United States Patent [19]

Prolss et al.

[11] 3,789,362
[45] Jan. 29, 1974

[54] INDICATING SYSTEM WITH LUMINOUS ELEMENTS

[75] Inventors: Hans Prolss; Wilhelm Hegeler, both of Hildesheim, Germany

[73] Assignee: Blaupunkt-Werke GmbH, Hildesheim, Germany

[22] Filed: May 10, 1972

[21] Appl. No.: 251,901

[30] Foreign Application Priority Data
May 13, 1971 Germany..........................2123736

[52] U.S. Cl. ........................ 340/147 LP, 340/172 R
[51] Int. Cl. ..............................................H04q 1/00
[58] Field of Search ............................. 340/147 LP

[56] References Cited
UNITED STATES PATENTS
1,153,737  9/1915  Hoorn............................ 340/147 LP
3,177,409  4/1965  Kroes............................ 340/147 LP
3,202,841  8/1965  Kunzke......................... 340/147 LP
3,368,200  2/1968  McNicol........................ 340/147 LP
3,671,816  6/1972  Ritzow.......................... 340/147 LP Primary Examiner—Harold I. Pitts
Attorney, Agent, or Firm—Flynn & Frishauf

[57] ABSTRACT

To control luminous elements, such as small lamps to indicate the received frequency on a scale of a communication receiver, by means of miniaturized electronic circuits without mechanically movable switches, the lamps are connected in a series circuit across a source of supply. Solid state switches are connected to the junctions of the lamps in the series circuit, and having two states, the switches being so controlled that all switches preceding one which is connected to one source terminal are likewise connected to that one source terminal and all switches subsequent to the one which is connected to the one source terminal are connected to the other source terminal, so that only a single lamp will light.

10 Claims, 7 Drawing Figures

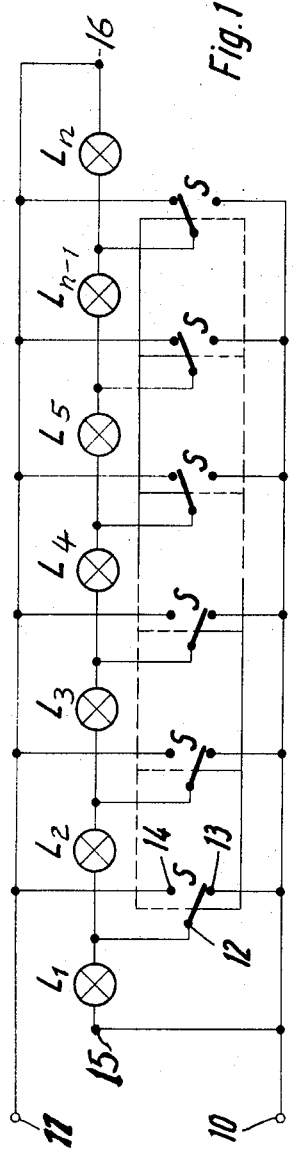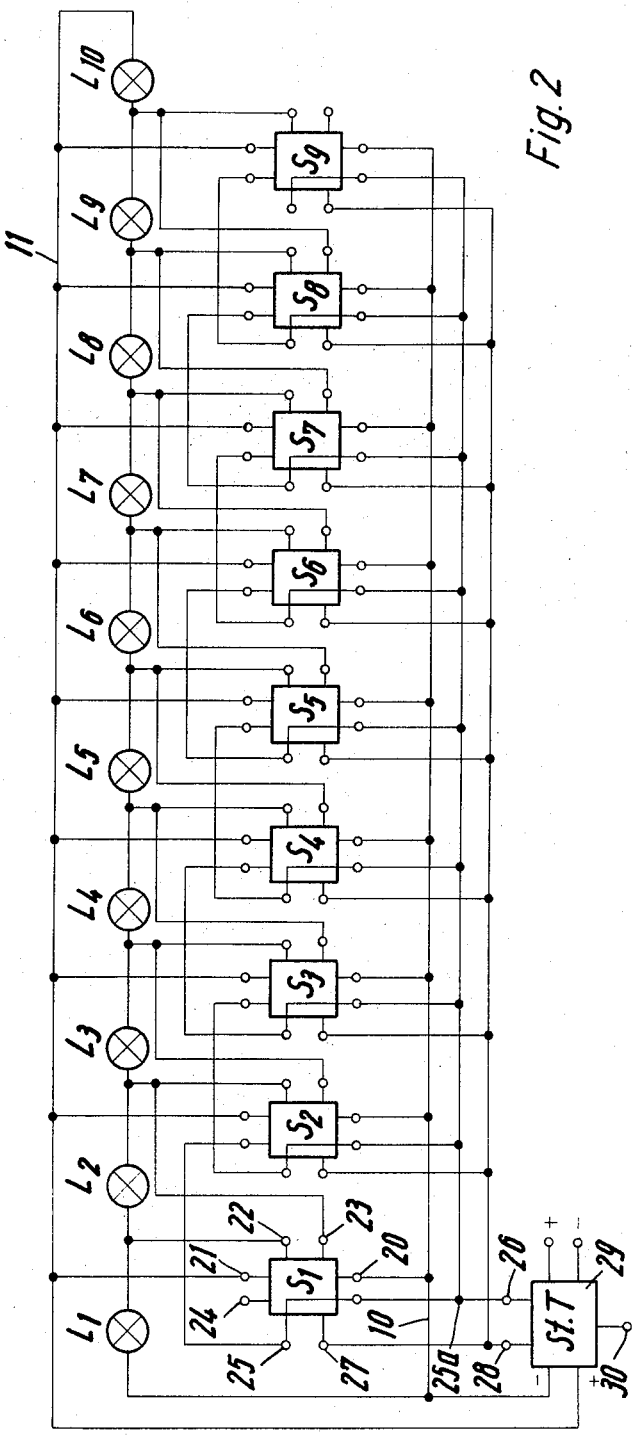

3,789,362

INDICATING SYSTEM WITH LUMINOUS ELEMENTS

BACKGROUND OF THE INVENTION

The present invention relates to an indicating system, and more particularly to an indicating system using luminous elements such as lamps, easpecially for use with communication receivers such as radio receivers and the like, in order to indicate the station or frequency of a station to which the receiver is tuned.

Indicators for radio or other connumication receivers and having electronic frequency control require an indicator for the user so that the user will know to which frequency the receiver is tuned. Mechanical indicators, such as pointers, rollers, or the like may be used to indicate the received frequency. Such types of indicators, however, require a relatively large window or scale in order to provide sufficient accuracy of indication. Such indicators then become comparatively expensive and require a fair amount of material. A further disadvantage of such indicating instruments is their comparatively slow response and lack of resistance to damage. Vibrations or shocks of the receiver, as may arise in portable equipment or in automobile or the like receivers easily interfere with the indicating capability of mechanical indicators controlled directly by electrical signals, and the indicating reliability over extended periods of time is low.

Television receivers use channel indications by providing an element which directly shows a specific channel number. In this type of indication, a tube, or the like, which indicates a number is used, the numbers being pre-selected. This type of indicator can be used only with receivers in which comparatively few transmitters can be tuned, and in which the station positions are pre-programmed, or pre-numbered. Receivers in which the transmitters are to be selected throughout a wide frequency band, with the transmitter frequency occurring at different positions depending on the location of the receiver, such as in an automobile receiver, cannot use such indicators since the specific frequency to which a receiver is turned can no longer be unambiguously indicated.

Indicators have been proposed in which a group of lamps are connected in series. Depending on the value to be indicated, a certain number of lamps are illuminated, starting from one end. Such indicators have been used to demonstrate high-fidelity apparatus and the like, and particularly for optical indication of certain pre-set or programmed output power of the final stage of an amplifier, for example in a demonstration studio. Indicators of this type cannot readily be used with receivers to indicate a certain tuned frequency, since it is not possible to illuminate only a single lamp, or a single zone or region within a frequency band.

It is an object of the present invention to provide an indicating arrangement which is entirely electronically controlled and which utilizes illuminating elements such as lamps or light emitting diodes, and in which only a single element corresponding to a predetermined frequency, or frequency band is illuminated.

SUMMARY OF THE INVENTION

Briefly, a group of indicating elements, such as lamps, light emitting diodes or the like are connected in series, the series connection itself being connected across a source of voltage supply. Two position switches which, in accordance with a feature of the invention are solid state switches built up of integrated circuits, such as flip-flops, are so connected that a change-over terminal of each switch is connected to the junction between adjacent indicating elements, and two fixed terminals of the switches are connected to the two respective terminals of the source. The switches are logically interconnected to connect all switches preceding one which is connected to one source terminal, likewise to that one source terminal and all switches subsequent to the one which is connected to the one source terminal, to the other source terminal. Thus, only a single lamp will be illuminated.

The indicating system of the present invention utilizes only very small space and permits illumination of a comparatively wise or extensive indicating field or scale. The system is immune against shocks or vibration, and the circuit in accordance with the present invention is simple, of low cost, compact, and can readily be constructed as an integrated circuit, easily controlled from electronic components providing low output power. The indicating device in accordance with the present invention can readily be read, is easily visible and can be distinguished from surrounding other indicators and is particularly suitable for small portable receivers, automobile radios or the like.

BRIEF DESCRIPTION OF THE DRAWINGS

The invention will be described by way of example with reference to the accompanying drawings, wherein:

FIG. 1 is a highly schematic circuit diagram illustrating, in the form of mechanical switches, the principle of the circuit of the present invention;

FIG. 2 is a circuit diagram similar to FIG. 1 but in which the switches are expanded, and showing their interconnection;

DESCRIPTION OF THE PREFERRED EMBODIMENTS

Figure 3:
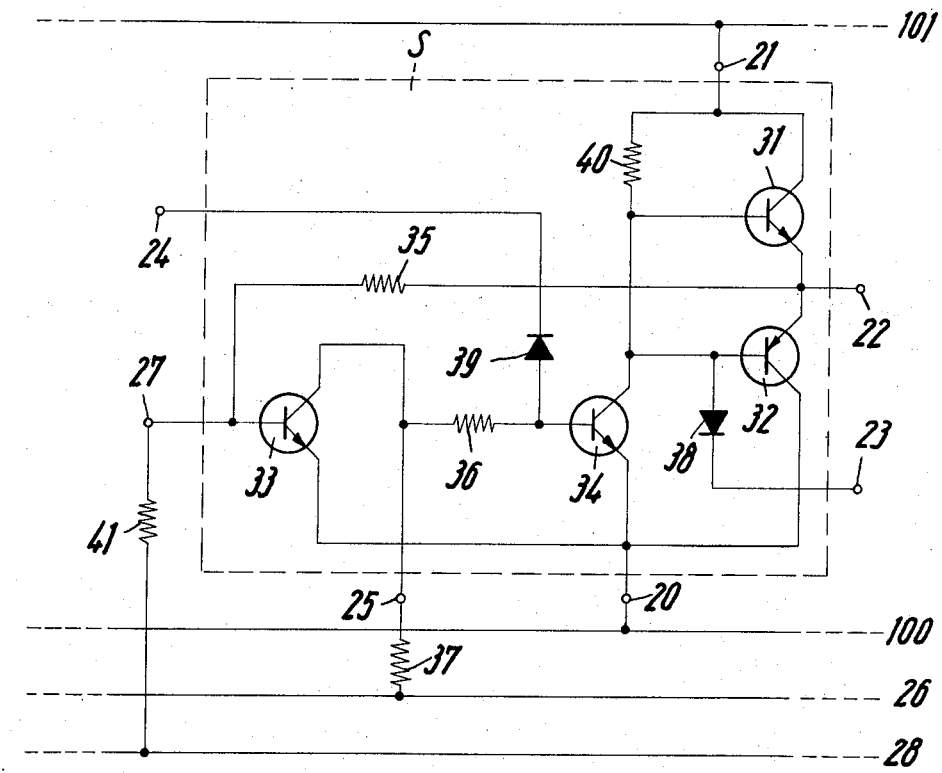
FIG. 3 is a detail of a switch.

The general, overall circuit diagram of FIG. 1 illustrates seven luminous elements L, such as light emitting diodes, low-power incandescent lamps or the like. The lamps are connected in series between a first terminal 10 of a source of potential, and a second terminal 11 thereof. Switches S are connected between the junctions of the series connected indicating elements which, hereinafter for brevity will merely be termed "lamps L,"in such a manner that a movable terminal 12 is connected to the junction, whereas the fixed terminals 13, 14 are connected to the respective terminals 10 and 11 of the source of supply. The input of first terminal 15 of the first lamp L1, is connected to the first terminal 10 of the source; the second or out terminal 16 of the last lamp $L_n$ is connected to the other terminal 11 of the source. The switches are so interlocked (not shown in FIG. 1) by electronic circuitry that only one lamp L can illuminate. The switches can switch in either one of the two states.

The interlocking of the switches is so carried out - by logic circuitry which will be described below - that all switches which are connected to the first terminal 10, that is, which have their working or switch-over contact 12 connected with the fixed contact 13 also cause switch-over of the preceding switches S to the first terminal 10. All those switches S in which the movable contacts 12 are connected with the fixed contacts 14 have all subsequent switches S likewise connected, so that their terminals likewise are connected to terminal 11 of the source. As can readily be determined by tracing out the circuit with these switch positions, only one lamp L will light, the others either being short-circuited or not connected.

The logical interconnection of the switches can readily be done by electronic logic interconnection. Referring now to FIG. 2: Nine switches $S_1$ –$S_9$ are interconnected or interlocked. Only the connections to switch S1 have been supplied with reference numerals, for simplicity in the drawing, the other switches being similarly connected. Each one of the switches has seven terminals. Terminal 20 is connected with terminal 10 of the source of voltage. Terminal 21 is connected to terminal 11 of the voltage source. The terminals 20, 21 of all the switches correspond to the fixed contacts 13, 14 of the switches in accordance with FIG. 1. Terminals 22 of the switches $S_1$ –$S_9$ then correspond to the movable or change-over contacts 12 of FIG. 1. These terminals are connected between ten lamps $L_1$ – $L_{10}$. The interconnecting terminals of the switches $S_1$ –$S_9$ among themselves are formed by terminals 23 and 24, terminal 23 being connected to each of the respective terminals 22 of the subsequent switch, and terminal 24 with a terminal 25 of the preceding switch. The terminals 25a provide a common bus for a control line 26. The terminals 27 form the control inputs for the switches $S_1$ –$S_9$ and are connected to a control bus 28. Control bus 26 and control bus 28 are the lines which are also connected to the source of voltage, that is, lines 10, 11, and are connected to a control element 29. Control element 29 has a control voltage applied thereto at terminal 30 for a command signal, for example a control voltage for an electronically tunable receiver, such as a receiver utilizing a voltage controlled variable capacity diode in its tuning circuit.

In operation, switches $S_1$ –$S_9$ are controlled by a control signal applied over control bus 28. That portion of the switches $S_1$ –$S_9$ which, in their quiescent condition, are all connected to terminal 11, is connected by energization of the control signal to the first terminal 10. The control bus then has a signal thereon which is a feedback or control signal of the switches which have changed state. Let it be assumed that a control signal, corresponding to the lamp $L_5$ is provided to the switch. In this case, switches $S_1$ –$S_4$ are connected to terminal 10 and switches $S_5$ –$S_9$ are connected to terminal 11. By interlocking and interconnecting one terminal 24 with a terminal 25 of the preceding switch, and a termainal 23 with a terminal 22 of the subsequent switch, the switching state of the switches $S_1$ –$S_4$ and of the switches $S_5$ –$S_9$ will remain so that only the lamp $L_5$ will light.

FIG. 3 illustrates the construction and the operation of a switch S in greater detail. A pair of complementary transistors 31, 32 as well as a pair of further switching transistors 33, 34 are interconnected to form a bistable flip-flop. Feedback resistor 35 interconnects the base of switching transistor 33 (corresponding to terminal 27) with the emitters of the complementary pair of transistors 31, 32, which form one terminal 22 (FIG. 2). The collector of switching transistor 33 is connected over a resistor 36 with the base of switching transistor 34 and, additionally, to terminal 25 which, in turn, is connected over a resistor 37 to the control bus 26. The emitter of the switching transistors 33, 34, each, and the collector of transistor 32 is connected to terminal 20, which is connected to negative terminal 100 of the source. The bases of transistors 32, 34 are connected, each, over a diode 38, 39 respectively, with terminals 23, 24, respectively. The bases of the complementary pair of transistors 31, 32 are interconnected, and further connected to the collector of the switching transistor 34 and, further, over a resistor 40 with terminal 21. The collector of transistor 31 likewise connects to terminal 21, which is connected to the positive voltage bus 101. Terminal 27 applies a control signal over a resistor 41 to the base of transistor 33 from the control bus 28.

Operation: in quiescent condition, that is, when no control signal is present, the switch is connected to positive bus 101. Terminal 22 (corresponding to termin al 12, FIG. 1) is connected over the collector-emitter path of the conductive transistor 31 to terminal 21 (corresponding to terminal 14, FIG. 1). A signal is transferred over resistor 35 to switching transistor 33 which likewise becomes conductive, so that the base of switching transistor 34 will be clamped to negative voltage represented by bus 100. As a consequence, switching transistor 34 blocks, and the base of transistor 33 will be clamped to positive voltage, likewise blocking transistor 32. In this state of the switch S, diode 38 blocks, so that the subsequent switch S is likewise connected with terminal 22 to positive bus 101. The setting of the switch S is thus not influenced by the subsequent switch. The diode 39 of the switch S is blocked when the preceding switch is connected to negative voltage bus 100, so that the switch S is not influenced by the preceding switch.

If, now, a control signal of negative voltage is applied over the control bus 28 and the resistor 41 to the base of switching transistor 33, switching transistor 33 will change to blocked condition. The base of switching transistor 34 then becomes more positive, and transistor 34 will become conductive, applying negative voltage to the bases of the complementary pair of transistors 31, 32. The pair will change over, that is, transistor 31 will block and transistor 32 will become conductive. Terminal 22 will assume negative potential of line 100. In this condition, diode 38 is blocked, so that the subsequent switch, which is connected to positive voltage 101, is not influenced thereby. The terminal 22 of switch S will clamp the diode 38 of the preceding switch to negative voltage corresponding to bus 100. The diode 39 of the subsequent switch is not influenced thereby.

Figure 4:
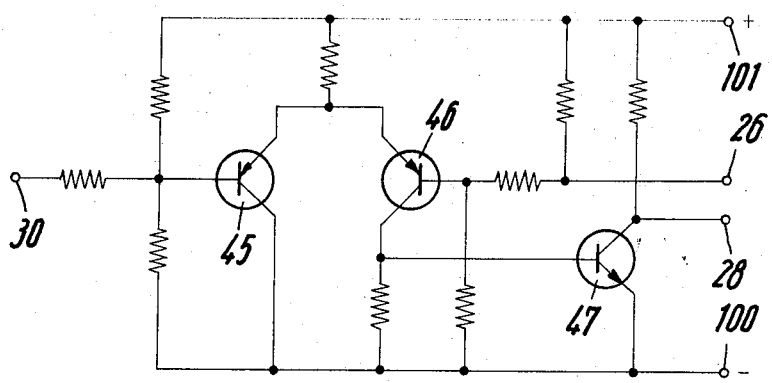
FIG. 4 is a circuit diagram of a control for the indicator.
Figure 5:
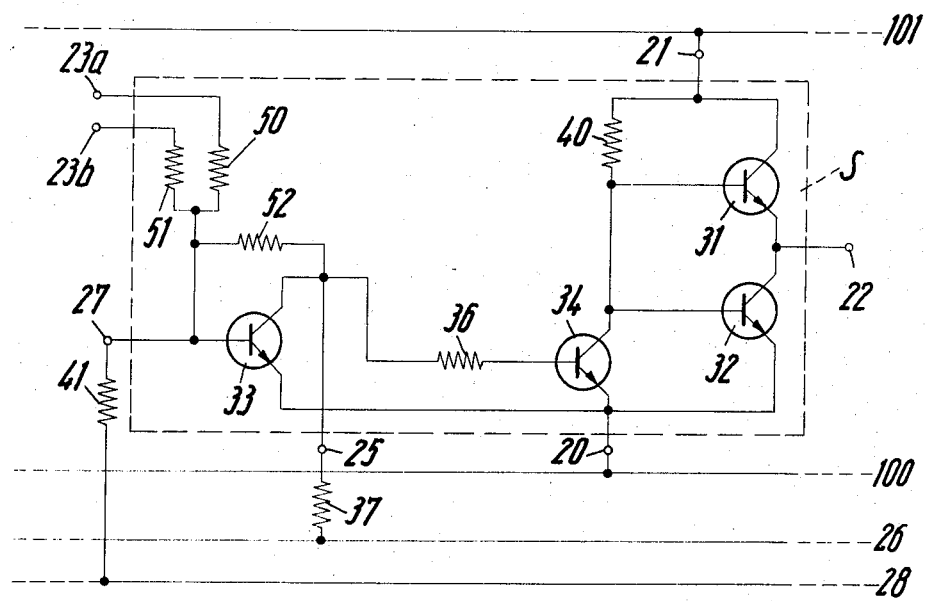
FIG. 5 is a circuit diagram of a different type of switch for the indicator.

The control circuit is illustrated in FIG. 4, and includes a differential amplifier formed of a pair of transistors 45, 46, connected in well known manner. The collector of transistor 46 is connected to the base of a further transistor 47, from the collector of which a control signal can be taken off. The command value, for example, a tuning voltage, is applied to the base of transistor 45. Control bus 26 is connected to the base of transistor 46. The control unit 29 operates by comparing the command value with the voltage on control bus 26 by means of the differential amplifier and applying any differences over transistor 47 to the control bus 28 until the voltage on control bus 26, which corresponds to the number of the switches S to be switched, is approximately the same as the commanded value. FIG. 5 illustrates a switch S which is constructed similar to the switch S of FIG. 3 and the same elements have been given the same reference numerals. The difference between the switches of FIGS. 3 and 5, in the interconnection, is in the connection of diodes 38, 39 and the feedback of resistor 35, all of which have been omitted. Instead, the interconnection lines with the terminals 23a, 23b are connected to terminal 27 of the switch S over a resistor 50, 51 respectively. A further resistor 52 couples the collector of the switching transistor back to its base. Terminals 23a and 23b are connected to the terminals 22 of the preceding switch, or the subsequent switch, respectively.

Operation in accordance with FIG. 5: Basically, the operation is similar to the circuit of FIG. 3, with this difference: The circuit of FIG. 5 permits an intermediate position between a pair of switches, which are held at different potentials. This permits two lamps to light simultaneously. In other words, and referring to the basic diagram of FIG. 1, the circuit of FIG. 5 permits a movable contact 12 to assume a completely off position between terminals 13, 14, by interrupting interconnection of the change-over element to the one or the other terminal of the source.

Figure 6:
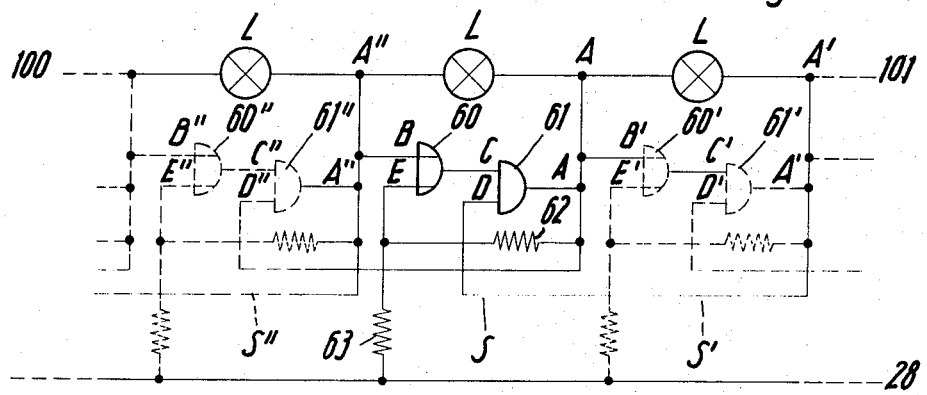
FIG. 6 is a fragmentary view of an indicating system with digital elements.

FIG. 6 illustrates a fragment from the indicating system, constructed with digital elements. The switch S includes an OR-gate 60 and an AND-gate 61, as well as resistors 62, 63 which correspond to the resistors 35, 41 of the switch in accordance with FIG. 5. The OR-gate 60 has a control input E connected over resistor 63 with control bus 28. Resistor 62 interconnects the control input E to the output A of the AND-gate 61, which is connected between a pair of lamps L. The output A of the AND-gate 61 is further connected to the second input B' of the OR-gate 60' of the subsequent switch S'. The input B of the OR-gate 60 is connected with output A" of the AND-gate 61' of the preceding switch S". The interconnection of the switches S", S, S' is equivalent to the switches described above. The logical interconnection satisfies the following equation:

$$A = C \cdot D = (A'' \& E) D = (B \& E) D = (A'' \& E) A'. \quad (1)$$

The above equation ensures that only one single Lamp L of the indicator series circuit, which is connected between the negative bus 100 and the positive bus 101, will light at any given time.

Figure 7:
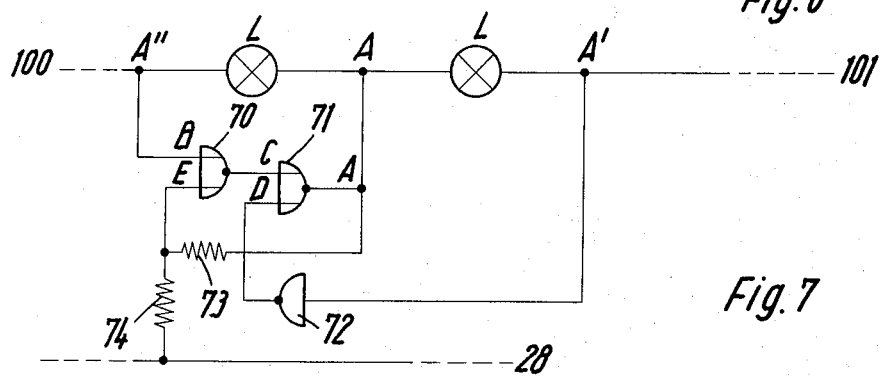
FIG. 7 is a fragmentary view similar to FIG. 6 but utilizing negating elements.

From the point of view of actual construction, it is simpler to utilize digital circuitry which have negating logic elements, since they are simpler to build. Referring to FIG. 7: a pair of NOR-gates 70, 71 and an inverter 72 are interconnected with resistors 73, 74 (corresponding to resistors 62, 63 of FIG. 6) as shown. The circuit functions similarly to the circuit of FIG. 6, and satisfies the following equation:

$$A = C \& D = \overline{(B \& E)} \& D = \overline{(\overline{A''} \& E)} \& \overline{A'} = (A'' \& E) A' \quad \text{tm (2)}$$

Comparing the above equations, it will be evident that the circuit of FIG. 6 and FIG. 7 operate similarly.

Interconnected switches, controlled by control buses can readily be constructed as integrated circuits, thereby providing visible, luminous output signals of tuned frequency ranges from control signals which are electrical, without the intervention of a mechanical movable element.

Various changes and modifications may be made within the inventive concept.

The switches are controlled from unit 29 by the voltage level output on line 28. The resistors connecting the individual switches to line 28 are of different value, so that the switches respond in dependence on the voltage level on line 28.

We claim:

1. Indicating system having indicator elements (L) adapted for connection to a two terminal source of power to energize the elements (10, 100; 11, 101) comprising a series circuit including the indicating elements ($L_1$ $L_2$ .... $L_n$) and the source, said indicating elements being connected in series relation, and said series connected indicating elements being connected between said two terminal source so that one terminal of the first indicating element ($L_1$) is connected to a first source terminal and the other terminal of the last indicating element in the series circuit ($L_{10}; L_n$) is connected to the other source terminal;

switches (S, $S_1$, $S_2$. ... $S_9$) having a change-over terminal (12) connected to the junction between adjacent indicating elements (L) and two fixed terminals (13, 14) connected to the two resepective terminals (10, 100; 11, 101) of the source;

and means logically interconnecting the switches to
a. connect all switches preceding a switch which is connected to one source terminal (10, 100), to said one source terminal (10, 100); and
b. to connect all switches subsequent to the said switch which is connected to said one source terminal (10, 100), to the other source terminal (11, 101).

2. System according to claim 1, wherein the switches comprise a pair of compatible transistors (31, 32) and means including additional transistors (33, 34) interconnecting said transistors to form a bistable flip-flop circuit.

3. System according to claim 2, wherein the interconnection means comprises a control circuit (29) including a differential amplifier (45, 46) to control the switches.

4. System according to claim 1, wherein the switches comprise digitally operating elements (60, 61, 70, 71, 72).

5. System according to claim 4, wherein the switches comprise an interconnected OR-gate and an AND-gate.

6. System according to claim 4, wherein the switches comprise interconnected NOR-gates (70, 71) and an interter (72).

7. System according to claim 4, wherein the digital interconnection of the switches is in accordance with the relationship $A = C \cdot D = (A'' \& E) D = (B \& E) D = (A'' \& E) A'$ or an equivalent relationship.

8. System according to claim 1, wherein the indicating elements are luminous elements.

9. System according to claim 1, wherein the switches and the logic interconnection means comprise integrated circuit means.

10. System according to claim 1, further comprising a control circuit (29) providing an output of varying voltage, the voltage level determining the number of switches which are to change state;

each one of said switches contain circuit element means (41, 35; 41, 36; 63, 62; 74, 73) having respective values characteristic of the specific switch and responsive to a specific voltage level to permit change-over of the state of a specific switch, upon a specific voltage level being supplied by said control means, the logical interconnecting means interconnecting and switching with respect to the specific switch, preceding and subsequent switches to connect said preceding and subsequent switches with the respective terminals of the source.

* * * * *